United States Patent [19]

Seguchi

[11] Patent Number: 4,924,421
[45] Date of Patent: May 8, 1990

[54] PRIORITY ENCODING SYSTEM
[75] Inventor: Yoshihiro Seguchi, Hyogo, Japan
[73] Assignee: Mitsubishi Denki Kabushiki Kaisha, Tokyo, Japan
[21] Appl. No.: 195,061
[22] Filed: May 17, 1988
[30] Foreign Application Priority Data Jul. 21, 1987 [JP] Japan .................... 62-182676

[51] Int. Cl.⁵ .............................................. G06F 7/00
[52] U.S. Cl. .............................................. 364/715.1
[58] Field of Search ............... 364/715.1, 715.08, 736, 364/748

[56] References Cited

U.S. PATENT DOCUMENTS 4,631,696 12/1986 Sakamoto ............................ 364/748
4,773,033 9/1988 Ikumi ................................ 364/715.1
4,789,956 12/1988 Hildebrandt .

OTHER PUBLICATIONS

"Circuit to Determine Number of Leading Zeros in a Binary String", IBM Tech. Discl. Bull., vol. 28, #2, pp. 854–855, Jul. 1985.
Mitsubishi Semiconductors Bipolar Digital IC LSTTL Data Book, 1985, pp. 2-162 to 2-163.

Primary Examiner—Gary V. Harkcom
Assistant Examiner—Tan V. Mai
Attorney, Agent, or Firm—Townsend and Townsend

[57] ABSTRACT

Where the first bit position having a predetermined value; e.g., 1, as viewed from the most significant bit (MSB) or least significant bit (LSB) of the input data, 1 is subtracted from the input data to provide a subtraction result. This subtraction result and the input data are provided to the inputs of an exclusive OR gate is applied to a priority encoder capable of encoding the first bit position having a 1 as viewed from the MSB. The output represents the first bit position having a 1 as viewed from the LSB, thus requiring only a single priority encoder capable of detecting the first bit position having a 1 as viewed from the MSB.

6 Claims, 5 Drawing Sheets

F I G. 4
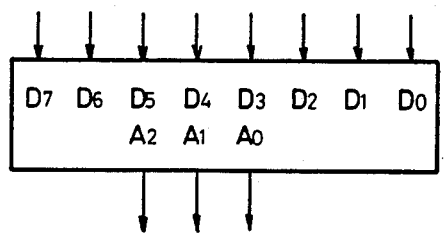

| INPUT<br>D7 D6 D5 D4 D3 D2 D1 D0 | OUTPUT<br>A2 A1 A0 |
|---|---|
| 1 x x x x x x x | 1 1 1 |
| 0 1 x x x x x x | 1 1 0 |
| 0 0 1 x x x x x | 1 0 1 |
| 0 0 0 1 x x x x | 1 0 0 |
| 0 0 0 0 1 x x x | 0 1 1 |
| 0 0 0 0 0 1 x x | 0 1 0 |
| 0 0 0 0 0 0 1 x | 0 0 1 |
| 0 0 0 0 0 0 0 1 | 0 0 0 |

A1 (table label), A2 A1 A0 (output header)

(b)

| INPUT<br>D7 D6 D5 D4 D3 D2 D1 D0 | OUTPUT<br>A2 A1 A0 |
|---|---|
| x x x x x x x 1 | 0 0 0 |
| x x x x x x 1 0 | 0 0 1 |
| x x x x x 1 0 0 | 0 1 0 |
| x x x x 1 0 0 0 | 0 1 1 |
| x x x 1 0 0 0 0 | 1 0 0 |
| x x 1 0 0 0 0 0 | 1 0 1 |
| x 1 0 0 0 0 0 0 | 1 1 0 |
| 1 0 0 0 0 0 0 0 | 1 1 1 |

A2 (table label)

A3 — x IS GIVEN VALUE.

PRIORITY ENCODING SYSTEM

BACKGROUND OF THE INVENTION

This invention relates to a logic operation system for detecting the first bit position having a 1 (or 0) as viewed from the least significant bit (LSB) of an input data by using a priority encoder capable of encoding the first bit position having a 1 (or 0) as viewed from the most significant bit (MSB).

FIG. 3 shows a conventional logic circuit for performing such an encoding operation. See the 1985 Mitsubishi Data Book, Bipolar Digital IC <LSTTL>, pp 2-162 to 2-163. In this figure, D is an 8-bit input data and $D_0$–$D_7$ are respective bits. When the 8-bit data D is applied to the input terminals, a pair of priority encoders 11 and 12 detect the predetermined priority bit positions among those having a 1 and generate 3-bit binary encoded outputs $A_M$ and $A_L$, respectively. The priority encoder 11 encodes the first bit position having a 1 as viewed from the MSB of the input data D while the priority encoder 12 encodes the first bit position having a 1 as viewed from the LSB.

FIG. 4 shows respective input and output bits of the priority encoder 11 or 12 of FIG. 3, in which like reference characters denote identical or equivalent parts or components of FIG. 3 and $A_0$–$A_2$ are respective bits of the encoded output $A_M$ or $A_L$.

FIGS. 5(a) and 5(b) show truth tables for the priority encoders 11 and 12, respectively, when the input and encoded output are 8-bit and 3-bit binary numbers, respectively. The symbol X is a given value.

The operation of this logic circuit will be described. Suppose that the input 8-bit data D is a binary number 00101010 and that the MSB and LSB are the 7th ($D_7$) and 0th ($D_0$) bits, respectively. This input data D has 1s at the 5th ($D_5$), 3rd ($D_3$), and 1st ($D_1$) bit positions.

The priority encoder 11 encodes the bit position of the 1 that is closest to the MSB in the input data D. In this example, it is the 5th bit ($D_5$). Consequently, the priority encoder 11 generates a binary number 101 encoding 5 of the 5th bit position $D_5$ according to the truth table of FIG. 5(a). The priority encoder 12, on the other hand, encodes the bit position of the 1 that is closest to the LSB in the input data D. In this example, it is the 1st bit ($D_1$). Consequently, the priority encoder 12 generates a binary number 001 encoding 1 of the 1st bit position $D_1$ according to the truth table of FIG. 5(b).

SUMMARY OF THE INVENTION

It is an object of the present invention to provide a compact logic operation system having a single priority encoder in contrast to the conventional one which has a pair of priority encoders.

Another object of the invention is to provide a simple logic operation system capable of performing a logic operation with a conventional logic circuit.

According to the invention, the first bit position having a 1 as viewed from the LSB may be encoded by feeding the result of an exclusive OR (XOR) operation on the input data and the value obtained by subtracting 1 from the input data to a priority encoder capable of encoding the first bit position having a 1 as viewed from the MSB.

Other objects, features, and advantages of the invention will be apparent from the following description taken in conjunction with the accompanying drawing.

BRIEF DESCRIPTION OF THE DRAWINGS

FIG. 4 is a block diagram of the priority encoder of the logic circuit of FIG. 3; and FIGS. 5(a) and 5(b) are truth tables of the priority encoders.

DESCRIPTION OF THE PREFERRED EMBODIMENT

Figure 1:
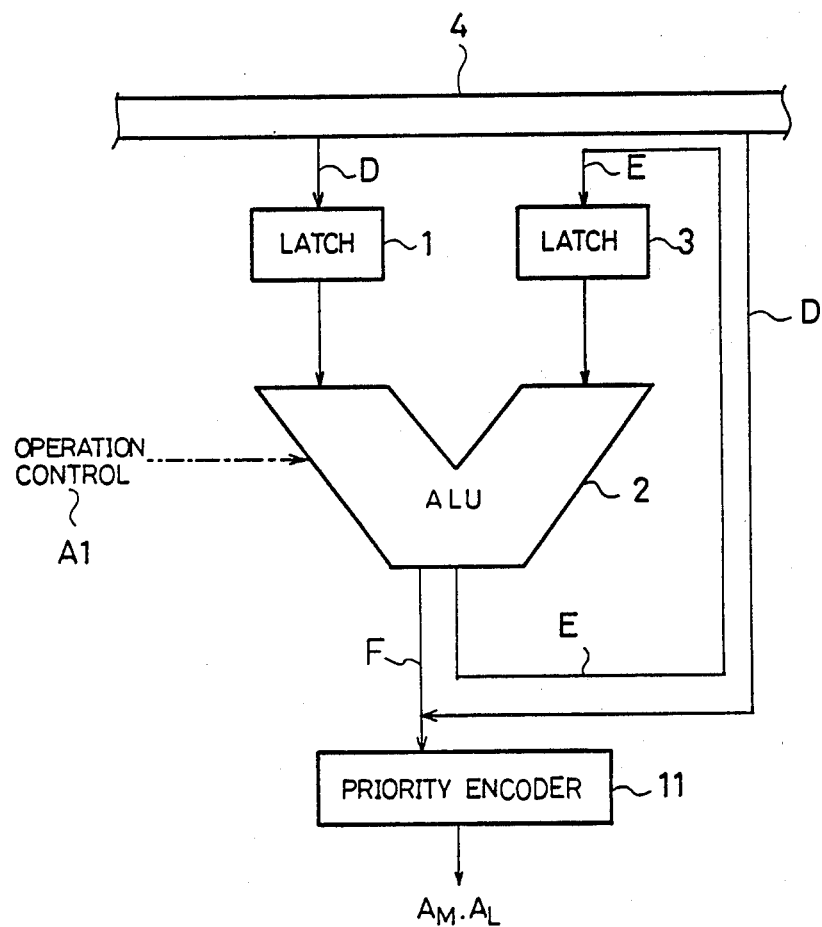
FIG. 1 is a block diagram of a logic circuit for a logic operation system according to an embodiment of the invention.
Figure 3:
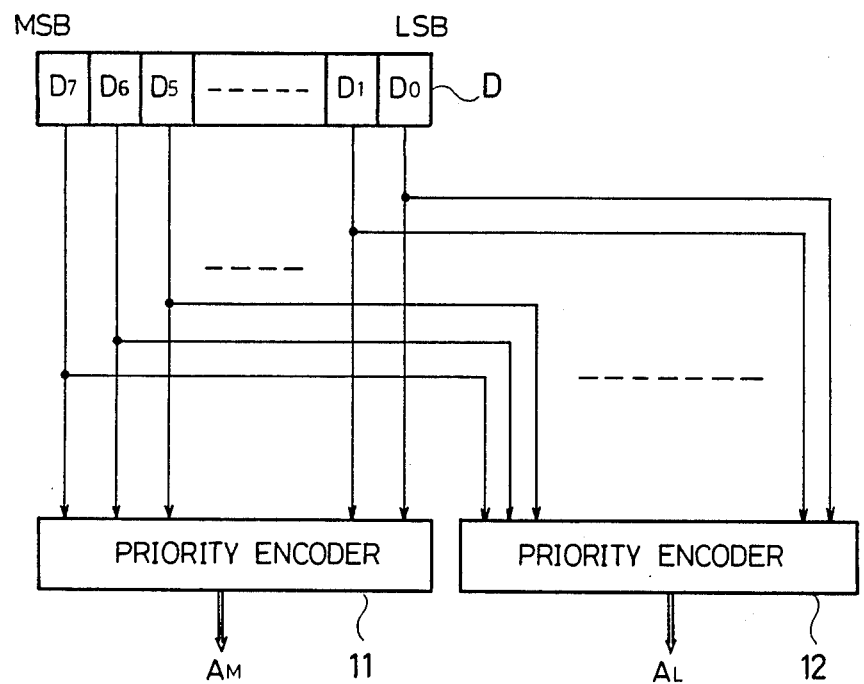
FIG. 3 is a block diagram of a conventional logic circuit.

In FIG. 1, there is shown a logic operation system in which like reference characters denote identical or equivalent parts or components of FIG. 3. A latch 1 is a first hold circuit for holding the input data D. An arithmetic and logical unit (ALU) 2 is capable of performing at least both subtraction and exclusive OR (XOR) operations. An operation control signal controls which operation is performed in the ALU 2. The system is also provided with a latch 3 as a second hold circuit and a data bus 4. The input data D is input in parallel to priority encoder 11 and the latch 1 via the data bus 4.

Figure 2:
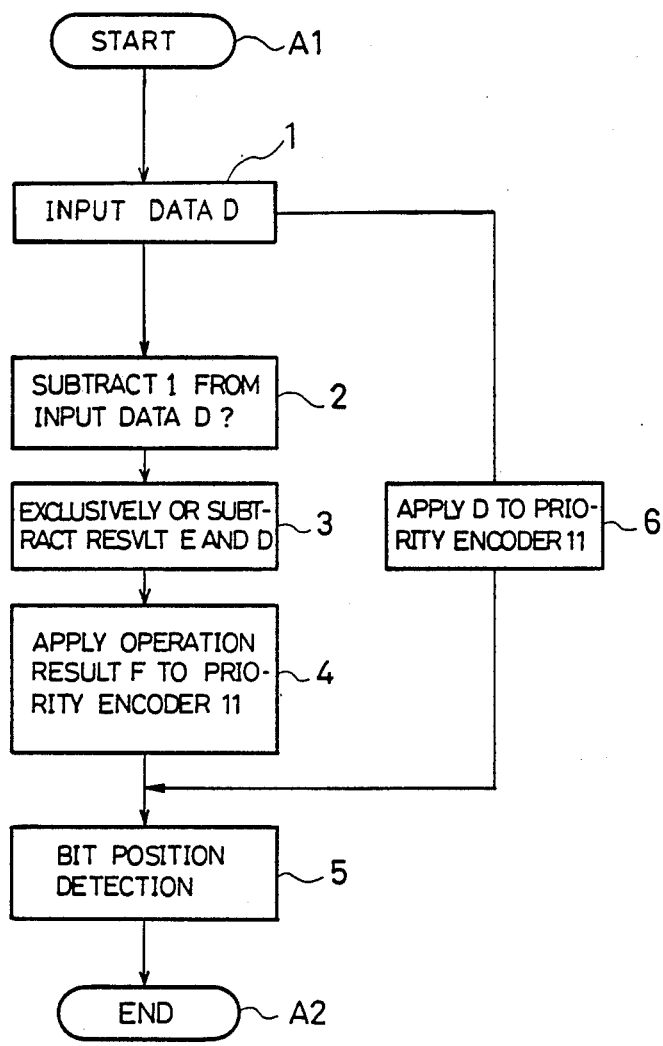
FIG. 2 is a flow chart showing the operational steps of the system of FIG. 1.

FIG. 2 shows respective steps from Step 1 through Step 6 of the operation of the system of FIG. 1. The operation will be described with reference to FIGS. 1 and 2. The input data D is applied to the data bus 4 in step 1. As the input data D proceeds from step 1 to step 6, the input data D is applied to the priority encoder 11. At this stage, the first bit position having a 1 as viewed from the MSB is detected and an encoded output $A_m$ is obtained (step 5).

As the input data D proceeds from Step 1 to Step 2, since the input data D has also been input to the latch 1, the input data D is held in the latch 1 and, then, 1 is substracted from the input data D in the ALU 2. Let the subtraction result be E or $E = D - 1$. The output destination of the subtraction result E is designated and this subtraction result E is held in the latch 3.

Then, the result F is applied to the priority encoder 11 after changing the destination by the arithmetic control signal. Once this is complete the bit position having a 1 is viewed from the MSB is encoded (Step 4), and the bit position is detected by the priority encoder 11 (Step 5). The new result is an encoded output $A_L$ representing the 1st bit position having a 1 as viewed from the LSB.

A specific example will be described. Suppose that the input 8-bit data D is 01101000. This data has 1s at the 6th ($D_6$), 5th ($D_5$), and 3rd ($D_3$) bit positions. Thus, the first bit positions having a 1 as viewed from the MSB and the LSB are the 6th and 3rd bit positions, respectively.

To encode the first bit position having a 1 as viewed from the MSB, the value of the input data D may simply be applied to the priority encoder 11. In this example, the priority encoder 11 generates a binary number 110 encoding the 6th bit position.

In order to encode the first bit position having a 1 as viewed from the LSB, on the other hand, 1 is subtracted from the input data D in the ALU 2 as described above. The subtraction result E is given as follows:

$$E = D - 1 = 01101000 - 1 = 01100111.$$

The input data D and the subtraction result E are then exclusively ored in the ALU 2. This XOR result F is given as follows:

$$F = D + E = 01101000 + 01100111 = 00001111.$$

The first bit position having a 1 in the XOR result F as viewed from the MSB is then encoded in the priority encoder 11. The XOR result F has 1s at the 3rd ($D_3$), 2nd ($D_2$), 1st ($D_1$), and 0th ($D_0$) bit positions. Thus, the output of the priority encoder 11 is a binary number 011 encoding the 3rd bit position according to the truth table of FIG. 5(a).

As described above, according to the invention, where the first bit position having a 1 as viewed from the MSB of the input data is detected, the input data D may merely be applied to the priority encoder 11 while, where the first bit position having a 1 as viewed from the LSB is detected, the result F computed in the ALU 2 according to the predetermined procedure may be applied to the priority encoder 11. The width of the input data D in the above embodiment is 8 bits but may be greater than this value to provide similar results.

The ALU 2 for performing the above subtraction and XOR operations may be conventional. The priority encoder for encoding the first bit position having a 1 as viewed from the MSB in the input data is necessary for standardizing the results of floating point computations so that it is almost always incorporated in a system capable of performing floating point computations, thus making it possible to use the existing system as it is.

In the above embodiment, the first bit position having a 1 as viewed from the LSB of the input data is encoded by means of the priority encoder capable of encoding the first bit position having a 1 as viewed from the MSB of the input data, but the present invention may be applied to encode the first bit position having a 0 as viewed from the MSB or LSB of the input data. For example, where a priority encoder capable of encoding the first bit position $D_6$ as viewed from the MSB of the input data 10010111 is used, 1 is added to the input data 10010111 to provide an addition result 10011000. The respective bits of an XOR result 00001111 of the input data 10010111 and the addition result 10011000 are inverted to provide an inverted result 11110000, which is applied to the above priority encoder to encode the first bit position having a 0 as viewed from the LBS of the input data or $D_3$. In this case, the operation of inverting the respective bits is required, but this operation is so basic that the existing system is used as it is in the same manner as in the above embodiment.

While a preferred embodiment of the invention has been described using specific terms, such description is given for illustrative purposes only, and it is to be understood that changes and variations may be made without departing the spirit and scope of the invention as recited in the appended claims.

What is claimed is:

1. A logic operation system comprising:
   a first holding circuit for holding an input data;
   an arithmetic and logical unit for performing an arithmetic operation to provide a first operation result;
   a second holding circuit for holding said first operation result;
   a priority encoder for encoding a first bit position having a predetermined value as viewed from a most significant bit of said input data; and
   said arithmetic and logical unit performing a logical operation on contents of said first and second holding circuits to provide a second operation result to said priority encoder thereby encoding a first bit position having said predetermined value as viewed from a least significant bit.

2. The logic operation system of claim 1, wherein said predetermined value is 1; said arithmetic operation is a subtraction of 1 from said input data; and said logical operation is an exclusive OR operation, thus encoding a first bit position having a 1 as viewed from said least significant bit.

3. The logic operation system of claim 1, wherein said predetermined value is 0; said arithmetic operation is an addition of 1 to said input data; and said logical operation is an exclusive OR operation and then an inversion operation, thus encoding a first bit position having a 0 as viewed from said least significant bit.

4. In a logic operation system including a priority encoder capable of encoding the first bit position as viewed from the most significant bit, a method for providing priority encoding of input data as viewed from the least significant bit, comprising the steps of:
   a. performing an arithmetic operation on the input data to produce a first result wherein the absolute value of the input data is changed by 1;
   b. exclusive ORing said first result with the input data to produce a second result; and
   c. applying said second result to a priority encoder to produce a third result such that the first bit position of said third result is equal to the priority encoded bit viewed from a least significant bit of the input data.

5. The method of claim 4 wherein said arithmetic operation is a subtraction of 1 from said input data.

6. The method of claim 4 wherein said arithmetic operation is an addition of 1 to said input data.

* * * * *